| United States Patent [19] | [11] Patent Number: 5,428,458 |
| --- | --- |
| Aiba et al. | [45] Date of Patent: Jun. 27, 1995 |

[54] IMAGE COMMUNICATING APPARATUS

[75] Inventors: Yoshinobu Aiba, Yokohama; Kunio Yoshihara, Sagamihara; Masanori Sakai, Yokohama; Hidenori Ozaki, Kawasaki, all of Japan

[73] Assignee: Canon Kabushiki Kaisha, Tokyo, Japan

[21] Appl. No.: 339,300

[22] Filed: Nov. 10, 1994

Related U.S. Application Data

[63] Continuation of Ser. No. 7,105, Jan. 21, 1993, abandoned.

[30] Foreign Application Priority Data

Jan. 22, 1992 [JP] Japan .................. 4-009283

[51] Int. Cl.⁶ .................. H04N 1/32; H04N 1/333
[52] U.S. Cl. .................. 358/434; 358/468; 358/405; 379/96; 379/100
[58] Field of Search .............. 358/400, 405, 406, 434, 358/435, 436, 438, 439, 442, 467, 468, 470; 379/96, 97, 98, 100

[56] References Cited

U.S. PATENT DOCUMENTS

| 4,827,349 | 5/1989 | Ogata et al. | 358/443 |
| 4,900,902 | 2/1990 | Sakakibara | 358/468 |
| 4,910,765 | 3/1990 | Matsuse et al. | 379/100 |
| 4,910,785 | 3/1990 | Nakatsuma | 382/9 |
| 4,922,349 | 5/1990 | Abe et al. | 358/443 |
| 4,949,188 | 8/1990 | Sato | 358/448 |

FOREIGN PATENT DOCUMENTS

| 0423019 | 4/1991 | European Pat. Off. |
| 2217547 | 10/1989 | United Kingdom |
| WO9015498 | 12/1990 | WIPO |
| WO9110309 | 7/1991 | WIPO |

*Primary Examiner*—Scott A. Rogers
*Assistant Examiner*—Thomas D. Lee
*Attorney, Agent, or Firm*—Fitzpatrick, Cella, Harper & Scinto

[57] ABSTRACT

An image communicating apparatus comprises: a reader as an image input unit for inputting code data such as character code or the like; a converter for converting the input code data into image data; a transmitting circuit for transmitting the code data supplied from the reader or the image data converted by the converter; and a controller for judging the function of an apparatus of the communication partner side and a line state or a communicating condition, thereby selecting either one of a mode to transmit the code data and a mode to transmit the image data converted by the converter in accordance with the results of the judgment. When the code data is transmitted in an error retransmitting mode and error data remains due to a defective line state or communicating condition, the controller selects the mode to transmit the image data converted by the converter.

14 Claims, 11 Drawing Sheets

FIG. 8

| CALLING END | CALLED END | |
|---|---|---|
| | CED | PHASE A |
| | NSF | |
| | CSI | |
| | DIS | |
| NSS | | |
| TSI | | PHASE B |
| DCS | | |
| TRAINING | | |
| TCF | | |
| | CFR | |
| TRAINING | | |
| IMAGE | | PHASE C |
| RTC | | |
| EOP | | PHASE D |
| | MCF | |
| DCN | | PHASE E |

FIG. 9

NSF AND NSS

| CCITT MEMBER CODE | | | | | | | |
|---|---|---|---|---|---|---|---|
| CCITT MEMBER CODE | | | | | | | |
| MAKER CODE | | | | | | | |
| | | | | | PS | LIPS III | LIPS II |

IMAGE COMMUNICATING APPARATUS

This application is a continuation of application Ser. No. 08/007,105 filed Jan. 21, 1993, now abandoned.

BACKGROUND OF THE INVENTION

1. Field of the Invention

The present invention relates to an image communicating apparatus and, more particularly, to an image communicating apparatus having a transmitting function of code data formed by a computer or the like.

2. Related Background Art

Hitherto, in a facsimile apparatus, an image is read and converted into an electric signal, the electric signal is coded, and after that, the coded signal is transmitted via a public line.

A document or the like created by a computer, word processor, or the like is printed out by a printer or is developed in a memory and, after that, the printed or developed data is coded and transmitted.

In case of printing-out of a document created by a computer or the like, data sent to the printer is often expressed by a well-known page description language (hereinafter, referred to as a PDL) such as LIPS or PostScript.

When an image printed out using the PDL is transferred via a facsimile apparatus, however, a picture quality fairly deteriorates. This is because when the image data is generated from the printer by the PDL, a resolution is set to 300 or 400 dpi (dots per inch), while a resolution based on the standard of the facsimile apparatus is set to 8 pel/3.85 lines. The resolution, therefore, must be fairly reduced. Further, as compared with a data amount of the PDL, a data amount which is obtained by developing the image data and, thereafter, coding the developed image data is extremely large.

There is, consequently, such a drawback that the PDL data must be purposely converted into the data this has a low resolution and requires a long communicating time and large costs, before transmission.

Regarding a facsimile apparatus in which data of character codes is converted into a facsimile image and transmitted, U.S. Pat. No. 4,827,349, 4,910,785, 4,922,349, etc. are issued.

As regards a printer system using a page description language, U.S. Pat. No. 4,949,188, etc. are issued.

However, techniques which can solve the above problems are not yet proposed.

SUMMARY OF THE INVENTION

It is an object of the invention to improve an image communicating apparatus in consideration of the above problems.

Another object of the invention is to provide an image communicating apparatus which can efficiently communicate code data.

Still another object of the invention is to provide an image communicating apparatus in which in case of transmitting code data, a function and a line state of an apparatus on the partner side are discriminated and, in accordance with the result of the discrimination, either one of a mode to directly transmit the code data and a mode to convert the code data into the image data and to transmit the converted image data is selected.

The above and other objects and features of the present invention will become apparent from the following detailed description and the appended claims with reference to the accompanying drawings.

BRIEF DESCRIPTION OF THE DRAWINGS

FIG. 8 is a diagram showing a procedure of the facsimile communication;

FIG. 9 is a diagram showing a bit construction of a procedure signal;

DETAILED DESCRIPTION OF THE PREFERRED EMBODIMENTS

An embodiment of the present invention will be described hereinbelow with reference to the drawings.

Figure 1:
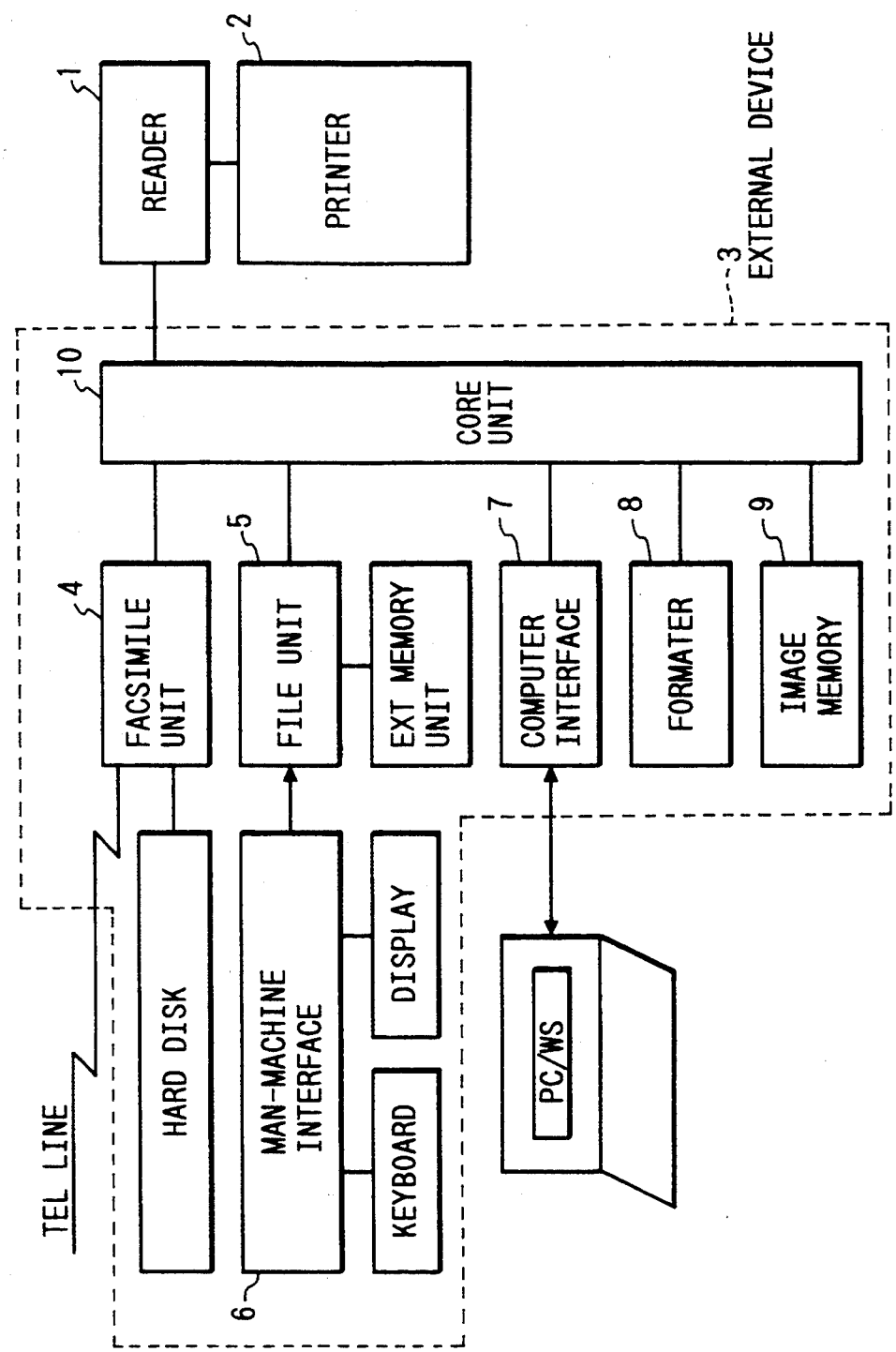
FIG. 1 is a block diagram showing a whole construction of an image processing system according to an embodiment.

FIG. 1 is a block diagram showing a whole construction of a system according to the embodiment.

In FIG. 1, reference numeral 1 denotes an image input apparatus (hereinafter, referred to as a reader) for converting an original image into image data.

Reference numeral 2 denotes an image output apparatus (hereinafter, referred to as a printer) which has a plurality of kinds of recording sheet cassettes and generates image data as a visible image onto a recording paper on the basis of a print instruction.

Reference numeral 3 denotes an external device which is electrically connected to the reader 1 and has various functions. The external device 3 comprises: a facsimile unit 4; a file unit 5; a man-machine interface 6 connected to the file unit 5; a computers interface 7 for connecting with a computer; a formater 8 used to convert information sent from the computer into a visible image; an image memory 9 for temporarily storing the information sent from the computer; and a core unit 10 for controlling each of the above functions.

The functions of the above respective sections will now be described in detail hereinbelow.

(Description of the reader)

Figure 2:
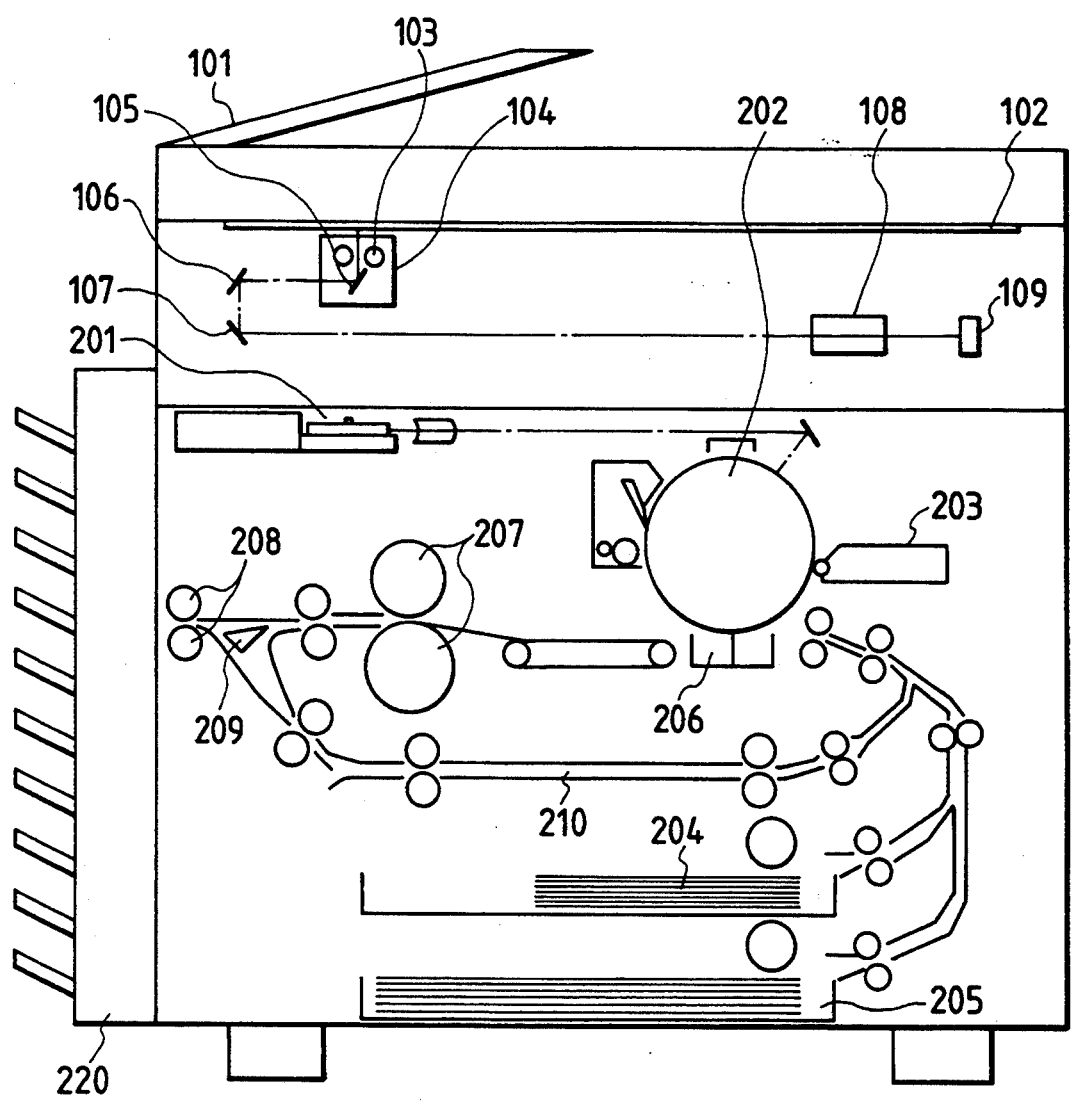
FIG. 2 is a block diagram of a reader 1 and a printer 2.
Figure 3:
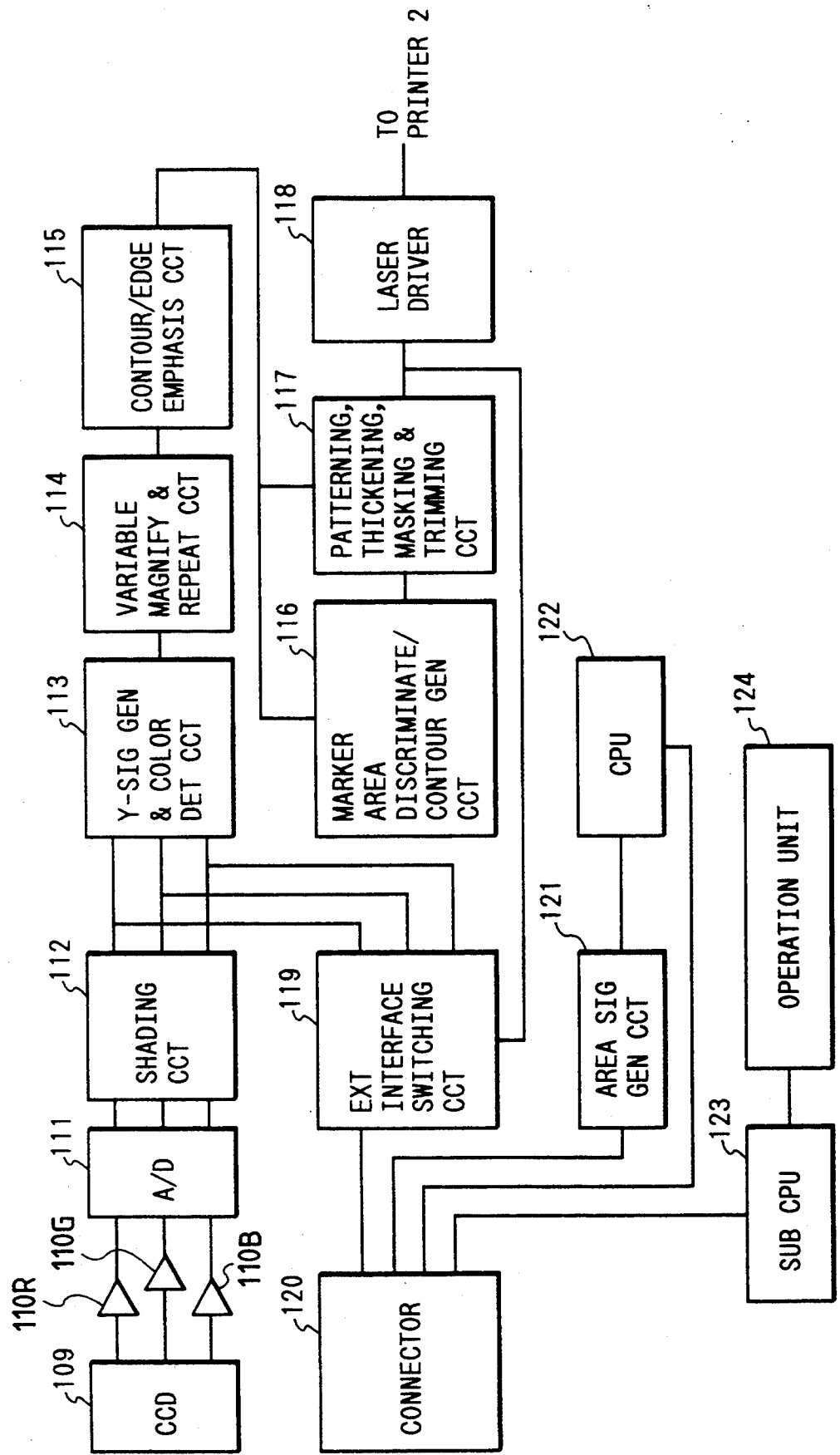
FIG. 3 is a block diagram showing a construction of an image processing section in the reader 1.

The reader will now be described in detail with reference to FIGS. 2 and 3.

Originals put on a document feeder 101 are sequentially conveyed one by one onto an original supporting glass surface 102. When the original is conveyed, a lamp of a scanner section 103 is lit on and a scanner unit 104 is moved to illuminate the original. The light reflected by the original is reflected by mirrors 105, 106, and 107 and passes through a lens 108. After that, the light transmitted through the lens 108 enters a CCD image sensor (hereinafter, referred to as a CCD) 109.

Image processes in the reader 1 will now be described in detail with reference to FIG. 3. Image information supplied to the CCD 109 is photoelectrically converted into an electric signal. The color information from the CCD 109 is amplified by amplifiers 110R, 110G, and 110B to be adequate for input signal levels of an A/D converter 111, respectively. Output signals from the A/D converter 111 are supplied to a shading circuit 112, by which a light distribution unevenness of the lamp of the scanner section 103 and a sensitivity unevenness of the CCD are corrected. Output signals from the shading circuit 112 are supplied to a Y-signal generation & color detection circuit 113 and an external interface switching circuit 119.

The Y-signal generation & color detection circuit 113 executes an arithmetic operation to the signals from the shading circuit 112 on the basis of the following equation, thereby obtaining a Y-signal.

$$Y = 0.3R + 0.6G + 0.1B$$

Further, the reader 1 has a color detection circuit for separating seven colors from signals of three colors of R (red), G (green), and B (blue) and outputting signals corresponding to the respective colors. Output signals from the circuit 113 are supplied to a variable magnify & repeat circuit 114. A variable magnification in the sub scanning direction is executed in accordance with a scanning speed of the scanner unit 104, and a variable magnification in the main scanning direction is executed by the circuit 114. Also, the same image can be outputted several times by the circuit 114. A contour/edge emphasis circuit 115 emphasizes a high frequency component of an output signal from the variable magnify & repeat circuit 114, thereby obtaining edge emphasis and contour information. An output signal from the contour/edge emphasis circuit 115 is supplied to a marker-area-discrimination/contour-generation circuit 116 and a patterning, thickening, masking and trimming circuit 117.

The marker-area-discrimination/contour-generation circuit 116 reads a portion written by a marker pen of a designated color on the original and generates marker contour information. Subsequently, the patterning, thickening, masking and trimming circuit 117 executes a process such as thickening, masking, or trimming from the contour information supplied from the circuit 116. The circuit 117 also executes a patterning by a color detection signal from the Y-signal generation & color detection circuit 113.

An output signal from the circuit 117 is supplied to a laser driver 118, by which the signal which has been subjected to various kinds of processes is converted into a signal for driving a laser. An output signal from the laser driver is supplied to the printer 2, by which a visible image is formed.

The external interface switching circuit 119 for interfacing (I/F) with an external device will now be described. In case of outputting image information from the reader 1 to the external device 3, the external interface switching circuit 119 allows the image information from the circuit 117 to be sent to a connector 120. When the reader 1 inputs the image 10 information from the external device 3, the external interface switching circuit 119 supplies the image information from the connector 120 to the Y-signal generation & color detection circuit 113.

The above image processes are executed in accordance with commands from a CPU 122. An area signal generation circuit 121 generates various kinds of timing signals which are necessary for the above image processes on the basis of the values set by the CPU 122. The CPU 122 also communicates with the external device 3 by using a communicating function provided therein. An SUB CPU 123 controls an operation unit 124 and also communicates with the external apparatus 3 by using a communicating function provided therein.

(Description of the printer)

The signal supplied to the printer 2 is converted into the photo signal by an exposure controller 201 and illuminates a photo sensitive material 202 in accordance with the image signal. The latent image formed on the photo sensitive material 202 by the illumination light is developed by a developing device 203. A copy transfer paper is conveyed from a copy transfer paper stacking section 204 or 205 at the timing which is matched with the timing of the latent image. The developed image is copy transferred onto the paper by copy transfer unit 206. The copy transferred image is fixed on the paper by a fixing unit 207. After that, the paper is delivered to the outside of the apparatus by a paper ejection unit 208. In the case where the sorting function is made operative by a sorter 220, the copy transfer paper delivered from the ejection unit 208 is ejected to each bin. When the sorting function is inoperative, the copy transfer paper is ejected to the highest bin of the sorter.

A method of sequentially generating images to be read to both sides of one output paper will now be described. The output paper fixed by the fixing unit 207 is once conveyed to the ejection unit 208. After that, the direction of the paper is reversed and the paper is again conveyed to a copy transfer paper stacking section 210 for refeeding through a conveying direction change-over member 209. When the next original is prepared, the original image is read in a manner similar to the above processes. However, since the copy transfer paper is again fed from the stacking section 210, two original images are eventually outputted to both of the front and back surfaces of the same output paper.

(Description of the external device)

The external device 3 is connected to the reader 1 by a cable and controls signals in a core unit in the external device 3 and also controls each function. The external device 3 comprises the facsimile unit 4 for executing the transmission and reception of facsimile image data, file unit 5 for converting various kinds of original information into electric signals and storing, computer interface 7 for interfacing the formater 8 for developing the code information from the computer into the image information and the computer, image memory 9 for accumulating the information from the reader 1 and for temporarily accumulating the information sent from the computer, and a core unit 10 for controlling each of the above functions.

The function of each section will now be described in detail hereinbelow.

(Description of the core unit)

Figure 4:
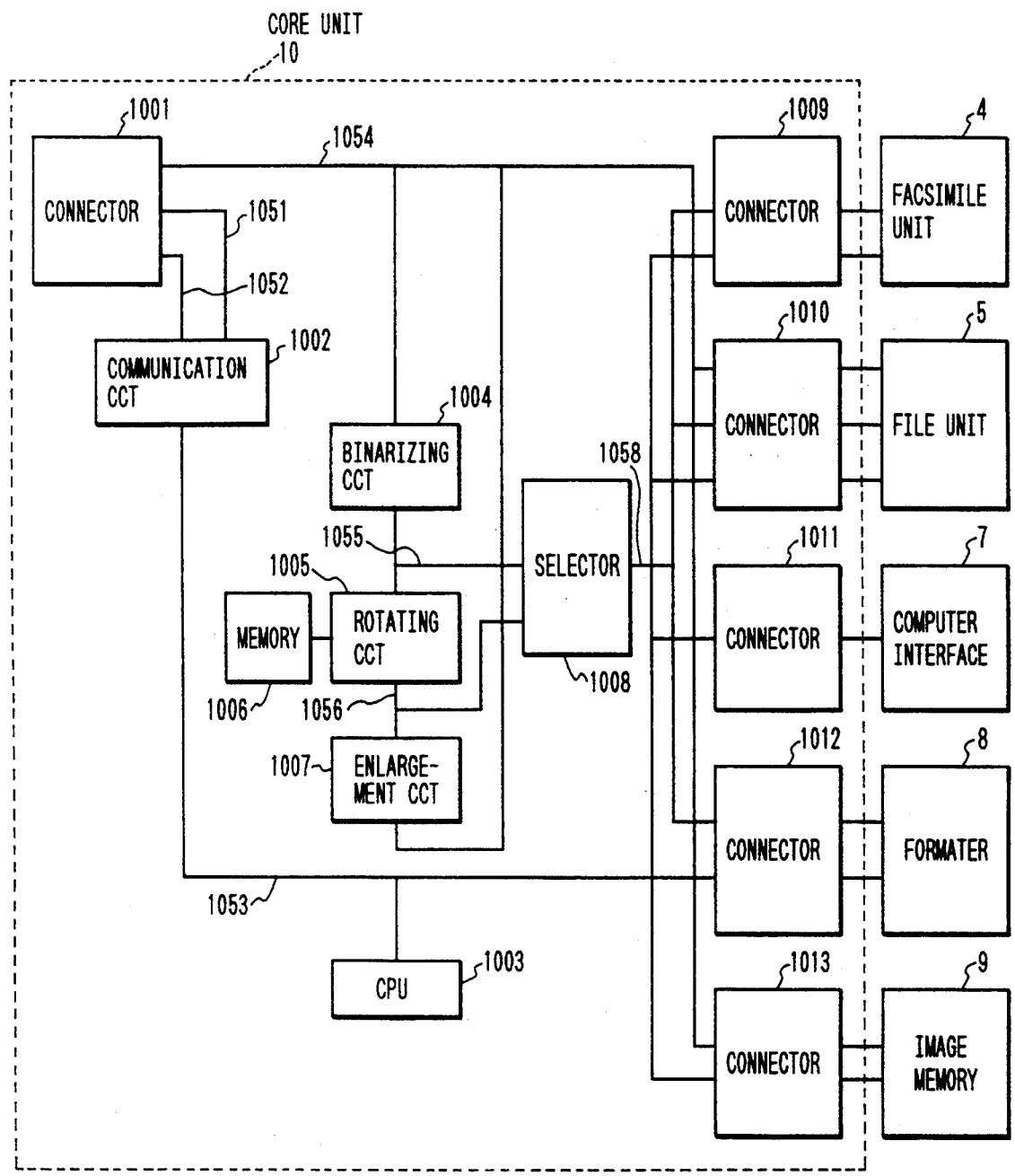
FIG. 4 is a block diagram showing a construction of a core unit 10.

The core unit will now be described with reference to FIG. 4. A connector 1001 of the core unit 10 is connected to the connector 120 of the reader 1 by a cable.

Three kinds of signals are provided in the connector 1001. Reference numeral 1054 denotes an 8-bit multi-value video signal and a video control signal; 1051 denotes a signal to communicate with the CPU 122 in the reader 1; and 1052 a signal to communicate with the SUB CPU 123 in the reader 1. The signals 1052 and 1053 are communication protocol processed by a communication IC 1002, thereby transmitting communication information to a CPU 1003 through CPU bus 1053.

The signal 1054 relates to a bidirectional signal line which can receive the information from the reader 1 by the core unit 10 and can send the information from the core unit 10 to the reader 1. The signal 1054 is connected to a binarizing circuit 1004 and connectors 1010 and 1013. The connector 1010 is connected to the file unit 5. The connector 1013 is connected to the image memory 9.

The binarizing circuit 1004 has a function to convert the 8-bit multivalue signal 1054 into the binary signal. The binarizing circuit 1054 has a simple binarizing function to binarize the multivalue signal 1054 by a fixed slice level, a binarizing function to perform the binarization by a functuation slice level in which a slice level fluctuates from the values of the pixels around a target pixel, and a binarizing function based on an error diffusion method. An output signal 1055 of the binarizing circuit 1004 is supplied to a rotating circuit 1005 and a selector 1008.

The rotating circuit 1005 functions together with a memory 1006. The information generated from the realder 1 is converted into the binary signal by the binarizing circuit 1004 through the connector 1001 and, after that, the information from the reader is stored into the memory 1006 under control of the rotating circuit 1005. The rotating circuit 1005 subsequently reads out the information from the memory 1006 by an instruction from the CPU 1003. An output signal 1056 of the rotating circuit 1005 is supplied to an enlargement circuit 1007.

The enlargement circuit 1007 first converts the binary signal 1056 into the multivalue signal. When the signal 1056 is set to 0, the binary signal is converted into "00"(hexa). When the signal 1056 is set to 1, the binary signal is converted into "FF"(hexa). The enlargement circuit 1007 can independently set enlargement magnifications in the X and Y directions by instructions from the CPU 1003 in accordance with an enlarging method based on a primary linear interpolating method. The output signal 1054 of the enlargement circuit 1007 is supplied to either one of the connectors 1001, 1010, and 1013 by an instruction of the CPU 1003.

The output signal 1055 of the binarizing circuit 1004 and the output signal 1056 of the rotating circuit 1005 are supplied to the selector 1008 and either one of them is selected in accordance with an instruction of the CPU 1003. An output signal 1058 of the selector 1008 is connected to the connectors 1009, 1010, and 1012.

The CPU bus 1053 is connected to the CPU 1003, communication IC 1002, and connectors 1009 to 1013. The CPU 1003 communicates with the reader 1 through the communication IC 1002. The CPU 1003 also communicates with the facsimile unit 4 through the connector 1009. Similarly, the CPU 1003 communicates with the file unit 5 through the connector 1010; the computer interface 7 through the connector 1011; the formater 8 through the connector 1012; and the image memory 9 through the connector 1013.

A flow of the signal of the core unit and each unit will now be described hereinbelow.

(Operation of the core unit by the information of the facsimile unit 4)

The case of outputting information to the facsimile unit 4 will now be described. The CPU 1003 communicates with the CPU 122 of the reader 1 through the communication IC 1002 and generates an original scan instruction. On the basis of such an instruction, the scanner unit 104 scans the original image and the realder 1 generates the read image information to the connector 120. The reader 1 is connected to the external device 3 by a cable. The information from the reader 1 is supplied to the connector 1001 of the core unit 10. The image information supplied to the connector 1001 is sent to the binarizing circuit 1004 through the 8-bit multivalue signal line 1054. The binarizing circuit 1004 converts the 8-bit multivalue signal 1054 into the binary signal. The binary signal 1055 is supplied to the selector 1008 or rotating circuit 1005. The output signal 1056 of the rotating circuit 1005 is also supplied to the selector 1008. The selector 1008 selects either one of the signals 1055 and 1056. The signal to be selected is decided by communicating with the facsimile unit 4 by the CPU 1003 through the data bus 1053. The binary signal 1058 from the selector 1008 is sent to the facsimile unit 4 through the connector 1009.

The case of receiving information from the facsimile unit 4 will now be described. The image information from the facsimile unit 4 is transmitted as a binary signal to the signal line 1058 via the connector 1009. The selector 1008 supplies the signal 1058 to either one of the signals 1055 and 1056 by an instruction of the CPU 1003. When the signal 1055 is selected, the binary signal from the facsimile unit 4 is subjected to a rotating process by the rotating circuit 1005 and, after that, the rotated signal is sent to the next enlargement circuit 1007. When the signal 1056 is selected as an output signal from the selector 1008, the signal is directly sent to the enlargement circuit 1007 without being subjected to the rotating process. The enlargement circuit 1007 converts the binary signal into the 8-bit multivalue signal and, after that, executes an enlarging process by the primary linear interpolating method. The 8-bit multivalue signal from the enlargement circuit 1007 is sent to the reader 1 through the connector 1001. The reader 1 supplies the 8-bit multivalue signal to the external interface switching circuit 119 via the connector 120. The switching circuit 119 sends the signal from the facsimile unit 4 to the Y-signal generation and color detection circuit 113. An output signal from the circuit 113 is processed in a manner similar to that mentioned above and, thereafter, the processed signal is sent to the printer 2, by which a visible image is formed on an output paper.

(Operation of the core unit by information of the file unit 5)

The case of outputting information to the file unit 5 will now be described. The CPU 1003 communicates with the CPU 122 of the reader 1 through the communication IC 1002 and issues the original scan instruction. On the basis of the original scan instruction, the scanner unit 104 scans the original image and the reader 1 outputs the image information to the connector 120. The reader 1 is connected to the external device 3 by a cable. The information from the reader 1 is supplied to the connector 1001 of the core unit 10. The image information supplied to the connector 1001 is sent to the connector 1010 or binarizing circuit 1004 via the 8-bit multivalue signal line 1054. In the case where the file unit 5 compresses the 8-bit multivalue information and files, the information of the signal 1054 is sent to the file unit 5 through the connector 1010. In the case where the file unit 5 compresses the binary information and files, the information is binarized by the binarizing circuit 1004.

The binarizing process and rotating process are omitted because they are similar to those described in case of the facsimile apparatus mentioned above. The binary signal 1058 from the selector 1008 is sent to the file unit 5 through the connector 1010.

The case of receiving information from the file unit 5 will now be described. The image information from the file unit 5 is transmitted to the signal line 1054 through the connector 1010 in case of the 8-bit multivalue signal. The image information is transmitted to the signal line 1058 in case of the binary signal. The signal 1054 is sent to the reader 1 via the connector 1001. The signal 1058 is sent to the selector 1008. The selector 1008 supplies the signal 1058 to either one of the signal lines 1055 and 1056 in accordance with an instruction from the CPU 1003. When the signal 1055 is selected, the signal is subjected to the rotating process and, after that, it is sent to the next enlargement circuit 1007. When the signal 1056 is selected as an output signal by the selector 1008, the signal is directly supplied to the enlargement circuit 1007 without being subjected to the rotating process. The 8-bit multivalue signal from the enlargement circuit 1007 is sent to the reader 1 through the connector 1001. The information of the file unit sent to the reader 1 is transmitted to the printer 2 in a manner similar to that in case of the facsimile apparatus mentioned above, so that a visible image is formed on the output paper.

(Operation of the core unit by information of the computer interface 7)

The computer interface 7 interfaces with the computer which is connected to the external device 3. The computer interface 7 has SCSI, RS232C, and centronics as computer interfaces. The computer interface 7 has the above three kinds of interfaces and the information from each interface is sent to the CPU 1003 through the connector 1011 and data bus 1053. The CPU 1003 executes various kinds of controls in accordance with the content sent.

(Operation of the core unit by information of the formater 8)

The formater 8 has a function to develop command data such as a document file or the like sent from the computer interface 7 mentioned above into image data. When the CPU 1003 judges that the data sent from the computer interface 7 via the data bus 1053 is the data regarding the formater 8, the CPU 1003 transfers the data to the formater through the connector 1012. The formater 8 develops the transferred data as a visible image into the memory. A procedure for receiving the information from the formater 8 and forming an image onto the output paper will now be described. The image information from the formater 8 is transmitted as a binary signal to the signal line 1058 through the connector 1012. The signal 1058 is supplied to the selector 1008. The selector 1008 supplies the signal 1058 to either one of the signal lines 1055 and 1056 by an instruction of the CPU 1003. When the signal 1055 is selected, the signal is subjected to the rotating process and, after that, the rotated signal is sent to the next enlargement circuit 1007. When the signal 1056 is selected as an output signal from the selector 1008, the signal is directly sent to the enlargement circuit 1007 without being subjected to the rotating process. The 8-bit multivalue signal from the enlargement circuit 1007 is sent to the reader 1 through the connector 1001. The information of the formater 8 sent to the reader 1 is sent to the printer 2 and an image is formed on the output paper in a manner similar to the case of the facsimile apparatus mentioned above.

(Operation of the core unit by information of the image memory 9)

The case of generating information to the image memory 9 will now be described. The CPU 1003 communicates with the CPU 122 of the reader 1 through the communication IC 1002 and generates the original scan instruction. On the basis of the original scan instruction, the scanner unit 104 scans the original image and the reader 1 outputs the reader image information to the connector 120. The reader 1 is connected to the external device 3 by a cable. The information from the reader 1 is sent to the connector 1001 of the core unit 10. The image information sent to the connector 1001 is supplied to the image memory 9 through the 8-bit multivalue signal line 1054 and connector 1013. The image information stored in the image memory 9 is sent to the CPU 1003 via the data bus of the connector 1013. The CPU 1003 transfers the data sent from the image memory 9 to the computer interface 7 mentioned above. The computer interface 7 transfers the data by desired one of the above three kinds of interfaces (SCSI, RS232C, and centronics).

The case of receiving information from the image memory 9 will now be described. First, the image information is sent from the computer to the core unit 10 through the computer interface 7. When the CPU 1003 of the core unit 10 judges that the data sent from the computer interface 7 through the data bus 1053 is the data regarding the image memory 9, the CPU 1003 transfers the data to the image memory 9 via the connector 1013. The image memory 9 subsequently transmits the data to the 8-bit multivalue signal line 1054 through the connector 1013. The signal 1054 is sent to the reader 1 through the connector 1001. The information of the image memory 9 sent to the reader 1 is supplied to the printer 2 and an image is formed on the output paper in a manner similar to the case of the facsimile apparatus mentioned above.

(Description of the facsimile unit 4)

Figure 5:
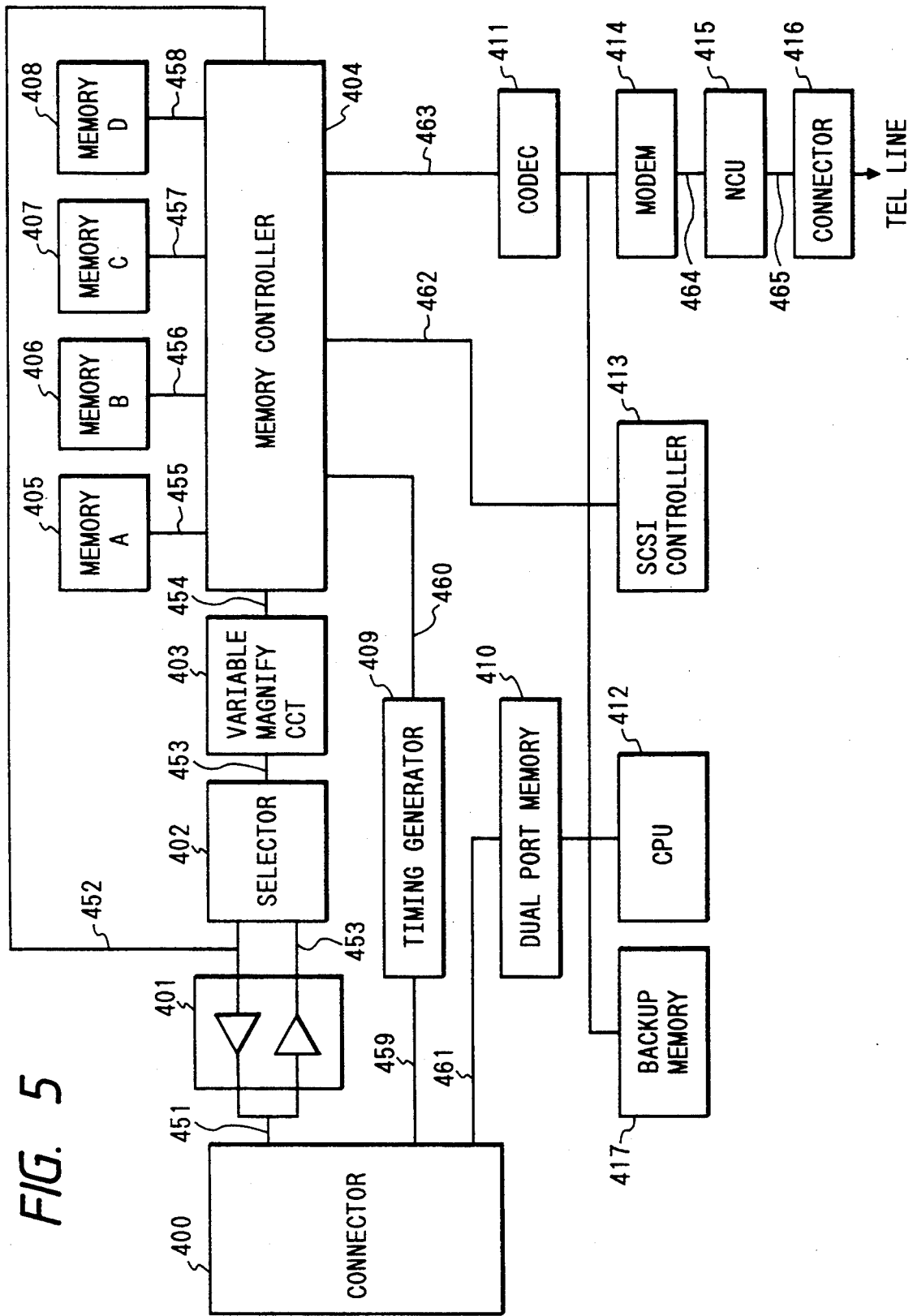
FIG. 5 is a block diagram showing a construction of a facsimile unit 4.

The facsimile unit 4 will now be described in detail with reference to FIG. 5.

The facsimile unit 4 is connected to the core unit 10 by a connector 400 and executes the transmission and reception of various kinds of signals. Reference numeral 451 denotes a bidirectional binary image signal which is connected to a buffer 401. The buffer 401 separates the bidirectional signal 451 to an output signal 452 from the facsimile unit 4 and an input signal 453 to the facsimile unit 4. The signals 452 and 453 are supplied to a selector 402. The selector 402 selects either one of the signal 452 and 453 by an instruction from a CPU 412. In case of storing the binary information from the core unit 10 into either one of memories A405 to D408, the selector 402 selects the signal 453. In case of transferring the data from one of the memories (either one of the memories A405 to D408) to another memory, the selector 402 selects the signal 452. The output signal 453 of the selector 402 is supplied to a variable magnify circuit 403 and is subjected to a variable magnifying process. In case of transmitting information by a facsimile, the variable magnify circuit 403 converts the reading resolution of 400 dpi of the reader 1 to a resolution in accordance with the facsimile apparatus on the reception side. An output signal 454 of the variable magnify circuit 403 is sent to a memory controller and is stored into either one of the memories A405, B406, C407, and D408 or a memory unit which is constructed by cascade connecting two memories under control of the memory controller. A memory controller 404 has the following four functions, namely: a mode to perform the data transmission and reception between the memories A405, B406, C407, and D408 and a CPU bus 462 in accordance with instructions from the CPU 412; a mode to perform the data transmission and reception with a CODEC bus 463 of a CODEC 411 (to execute the encoding and decoding processes based on MH, MR, MMR, or the like) having encoding and decoding functions; a mode to store the binary video input data 454 into either one of the memories A405 to D408 under control of a timing generator 409; and a mode for reading out the memory content from either one of the memories A405 to D408 and supplying to the signal line 452. Each of the memories A405 to D408 has a capacity of 2 Mbytes and stores image data corresponding to the original of the A4 size at a resolution of 400 dpi. The timing generator 409 is connected to the connector 400 by a signal line 459 and is made operative by control signals (HSYNC, HEN, VSYNC, VEN) from the core unit 10 and generates a signal to 10 to accomplish the following two functions. That is, one is a function to store the image signal from the core unit 10 into either one or two of the memories A405 to D408 and the other is a function for reading out the image signal from either one of the memories A405 to D408 and transmitting to the signal line 452. A dual port memory 410 is connected to the CPU 1003 of the core unit 10 through a signal line 461 and to the CPU 412 of the facsimile unit 4 through the signal line 462. Each of the CPUs 1003 and 412 performs the transmission and reception of commands through the dual port memory 410. An SCSI controller 413 interfaces with a hard disc connected to the facsimile unit 4 in FIG. 1. Data or the like in the facsimile transmission or reception or the like is accumulated. The CODEC 411 reads out the image data stored in either one of the memories A405 to D408 and encodes by a desired one of the MH, MR, and MMR methods and, thereafter, stores as coded data into either one of the memories A405 to D408. On the other hand, the coded data stored in either one of the memories A405 to D408 is read out and decoded by desired one of the MH, MR, and MMR methods and, after that, it is stored as decoded data or image data into either one of the memories A405 to D408. An MODEM 414 has a function for modulating the coded data from the hard disc connected to the CODEC 411 or SCSI controller 413 in order to transmit it to a telephone line and a function for demodulating the information sent from an NCU 415 into coded data and for transferring the coded data to the hard disc connected to the CODEC 411 or SCSI controller 413. The NCU 415 is directly connected to the telephone line and performs the data transmission and reception with an exchange installed in a telephone station or the like in accordance with a predetermined procedure. A backup memory 417 is a memory to store and hold information, telephone number, and the like which are necessary to control.

One operation in the facsimile transmission will now be described. The binary image signal from the reader 1 is supplied from the connector 400 and is sent to the buffer 401 via the signal line 451. The buffer 401 generates the signal 451 to the signal line 453 on the basis of the setting of the CPU 412. The signal 453 is supplied to the selector 402 and, thereafter, reaches the variable magnify circuit 403. The variable magnify circuit 403 converts the resolution from a resolution of 400 dpi of the reader 1 to a resolution of the facsimile transmission. The output signal 454 from the variable magnify circuit 403 is stored into the memory A405 by the memory controller 404. A timing signal to decide the timing for storing the output signal 454 into the memory A405 is generated from the timing generator 409 by the timing signal 459 from the reader 1. The CPU 412 connects the memories A405 and B406 of the memory controller 404 to the bus line 463 of the CODEC 411. The CODEC 411 reads out the image data from the memory A405 and encodes it by the MR method and writes the coded data into the memory B406. When the CODEC 411 encodes the image data of the original of the A4 size, the CPU 412 connects the memory B406 of the memory controller 404 to the CPU bus 462. The CPU 412 sequentially reads out the coded data from the memory B406 and transfers to the MODEM 414. The MODEM 414 modulates the coded data and transmits the facsimile data onto the telephone line through the NCU.

One operation in the facsimile reception will now be described. The information sent via the telephone line is supplied to the NCU 415 and is connected to a telephone line by the NCU 415 in accordance with a predetermined procedure. The information from the NCU 415 is sent to the MODEM 414 and demodulated. The CPU 412 stores the information from the MODEM 414 into the memory C407 through the CPU bus 462. When the information of one picture plane is stored into the memory C407, the CPU 412 controls the memory controller 404, thereby connecting a data line 457 of the memory C407 to the line 463 of the CODEC 411. The CODEC 411 sequentially reads out the coded data from the memory C407 and stores into the memory D408 as decoded data, namely, as image data. The CPU 412 communicates with the CPU 1003 of the core unit 10 through the dual port memory 410 and sets the printer 2 so as to generate a print image through the core unit from the memory D408. After completion of the setting, the CPU 412 makes the timing generator 409 operative and generates a predetermined timing signal from a signal line 460 to the memory controller. The memory controller 404 reads out the image data from the memory D408 and transmits to the signal line 452 synchronously with the signal from the timing generator 409. The signal 452 is sent to the buffer 401 and is supplied to the connector 400 through the signal line 451. Since the operations which are executed until the image data is sent from the connector 400 to the printer 2 are executed in a manner similar to those described with respect to the core unit, their descriptions are omitted here.

(Description of the computer interface 7)

Figure 6:
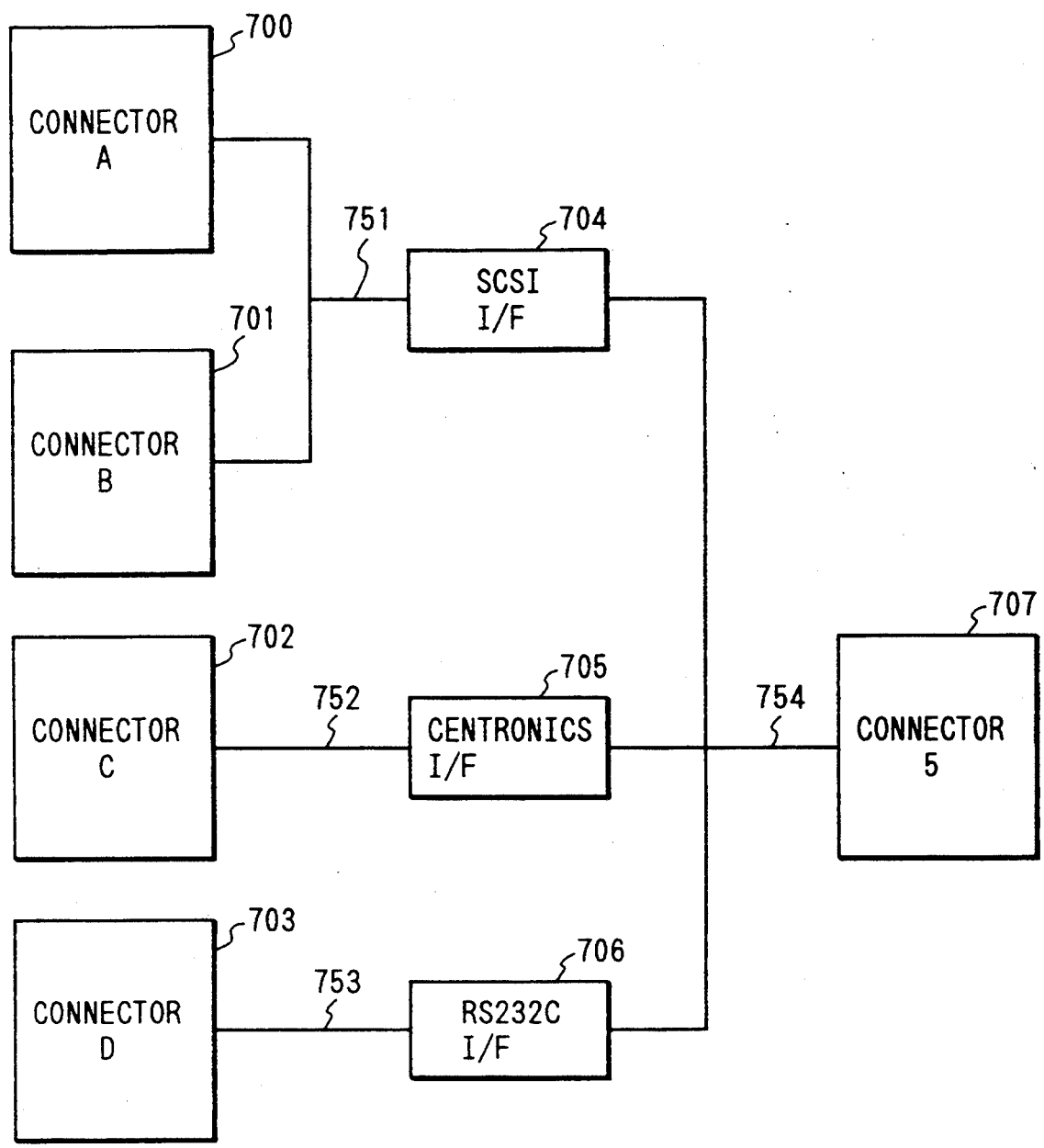
FIG. 6 is a block diagram showing a construction of a computer interface 7.

The computer interface 7 will now be described hereinbelow with reference to FIG. 6.

Reference numerals A700 and B701 denote connectors for SCSI (Small Computer System Interface) interface; C702 a connector for centronics interface; D703 a connector for RS232C interface; and E707 a connector to connect with the core unit 10.

The SCSI interface has two connectors (A700 and B701). In case of connecting an apparatus having a plurality of SCSI interfaces, it is cascade connected by using the connectors A700 and B701. In case of connecting the external device 3 and the computer in a one-to-one corresponding manner, the connector A700 is connected to the computer by a cable. A terminator is connected to the connector B701 or the connector B701 is connected to the computer by a cable and a terminator is connected to the connector A700. The information which is supplied from the connector A700 or B701 is sent to an SCSI interface 704 via a signal line 751. After completion of the procedure according to the SCSI protocol, the SCSI interface 704 generates data to the connector E707 via a signal line 754. The connector E707 is connected to the CPU bus 1053 of the core unit 10. The CPU 1003 of the core unit 10 receives the information supplied to the connectors (A700 and B701) for SCSI interface from the CPU bus 1053. The data from the CPU 1003 of the core unit 10 is sent to the SCSI connectors (A700 and B701) in accordance with a procedure opposite to that mentioned above.

The centronics interface is connected to the connector C702 and data is supplied to a centronics interface 705 via a signal line 752. The centronics interface 705 receives the data in accordance with a procedure of a predetermined protocol and generates the data to the connector E707 via the signal line 754. The connector E707 is connected to the CPU bus 1053 of the core unit 10. The CPU 1003 of the core unit 10 receives the information sent to the connector (C702) for centronics interface from the CPU bus 1053.

The RS232C interface is connected to the connector D703 and data is supplied to an RS232C interface 706 through a signal line 753. The RS232C interface 706 receives the data in accordance with a procedure of a predetermined protocol and generates the data to the connector E707 through the signal line 754. The connector E707 is connected to the CPU bus 1053 of the core unit 10. The CPU 1003 of the core unit 10 receives the information supplied to the connector (D703) for RS232C interface from the CPU bus 1053. The data from the CPU 1003 of the core unit 10 is supplied to the connector (D703) for RS232C interface in accordance with a procedure opposite to that mentioned above.

(Description of the formater 8)

Figure 7:
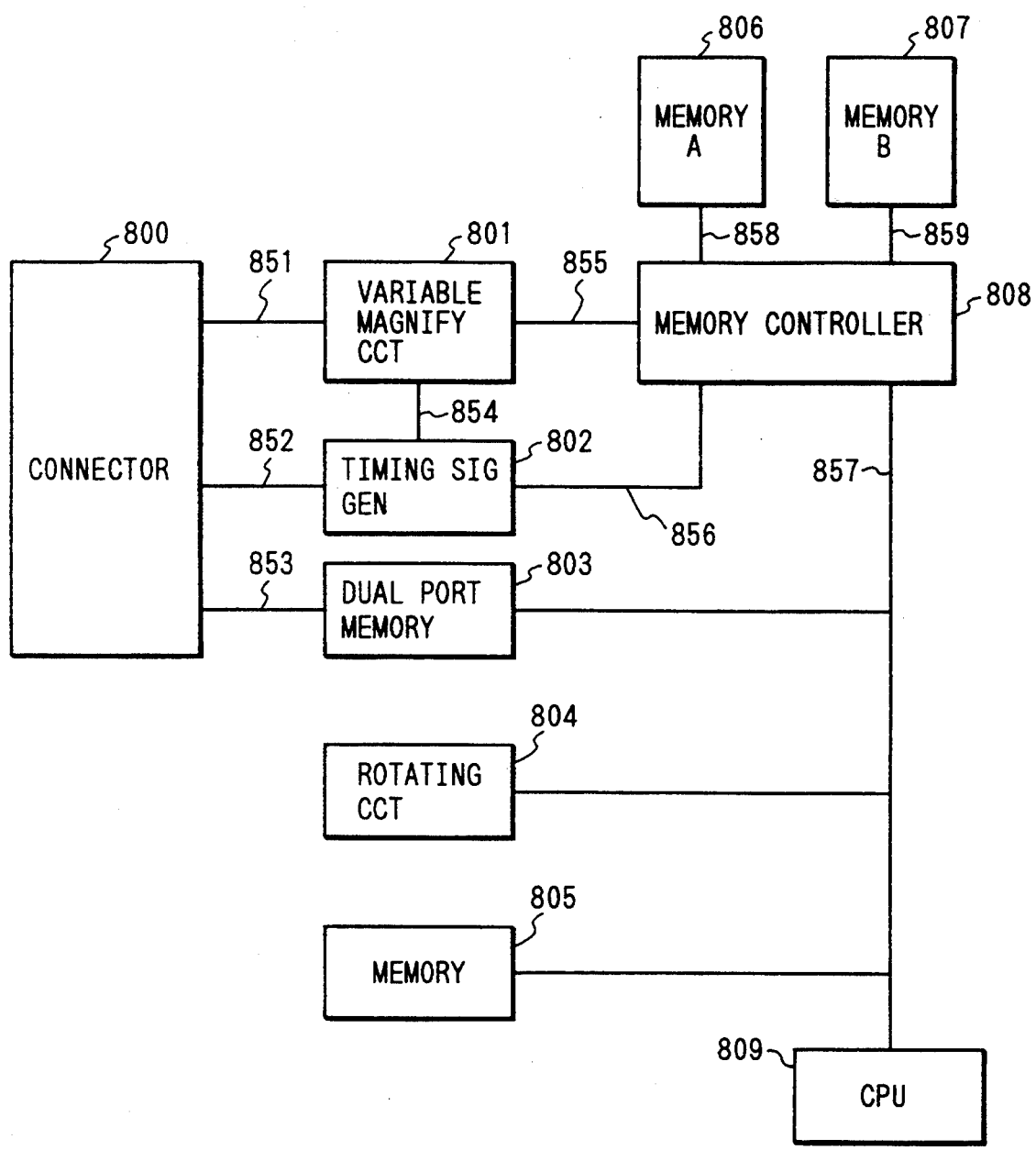
FIG. 7 is a block diagram showing a construction of a formater 8.

The formater 8 will now be described with reference to FIG. 7.

The data of the PDL or the like from the computer interface 7 which has already been described above is discriminated by the core unit 10. In case of the data regarding the formater 8, the CPU 1003 of the core unit 10 transfers the data from the computer to a dual port memory 803 through the connector 1012 of the core unit 10 and a connector 800 of the formater 8. A CPU 809 of the formater 8 receives the code data sent from the computer from the dual port memory 803. The CPU 809 sequentially develops the code data into the image data and transfers the image data to a memory A806 or B807 through a memory controller 808. Each of the memories A806 and B807 has a capacity of 2 Mbytes and can store the image data corresponding to the original of the A4 size at a resolution of 400 dpi by one memory (A806 or B807). In case of storing the image data corresponding to the original of the A3 size at a resolution of 400 dpi, the memories A806 and B807 are cascade connected and the image data is developed into those memories. The above memories are controlled by the memory controller 808 in accordance with instructions from the CPU 809. In the development of the image data, when it is necessary to perform the rotation of characters, figure, or the like, the image data is rotated by a rotating circuit 808 and, after that, the rotated image data is transferred into the memory A806 or B807. After the image data was developed into the memory A806 or B807, the CPU 809 controls the memory controller 808 and connects a data bus line 858 of the memory A806 or a data bus line 859 of the memory B807 to an output line 855 of the memory controller 808. The CPU 809 subsequently communicates with the CPU 1003 of the core unit 10 through the dual port memory 803 and sets a mode to generate the image data from the memory A806 or B807. The CPU 1003 of the core unit 10 sets a print output mode into the CPU 122 through the communication circuit (or communication IC) 1002 in the core unit 10 by using the communicating function provided in the CPU 122 of the reader 1. The CPU 1003 of the core unit 10 makes a timing generator 802 operative through the connector 1013 and the connector 800 of the formater 8. In accordance with the signal from the core unit 10, the timing generator 802 generates a timing signal to read out the image data from the memory A806 or B807 to the memory controller 808. The image data read out from the memory A806 or B807 is supplied to a variable magnify circuit 801 through the signal lines 858 and 855. The variable magnify circuit 801 executes a variable magnifying process in accordance with an instruction from the CPU 809 and, thereafter, transfers the variable manified signal to the core unit 10 via a signal line 851 and the connector 800. Since the operations which are executed until the image data is sent from the core unit 10 to the printer 2 and an image is generated therefrom are performed in a manner similar to those with respect to the core unit 10, their descriptions are omitted here.

The case where the PDL data from the computer in the embodiment is transmitted and received by the facsimile apparatus will now be described hereinbelow.

The operations which are executed until the data (for example, data which is expressed by a page description language such as LIPS II or the like) is sent to the core unit 10 through the computer interface 7 are performed in a manner similar to those mentioned above. Since the core unit 10 communicates the data via the facsimile, the core unit 10 transfers the data to the dual port memory 803 of the formater 8 and also to the dual port memory 410 of the facsimile unit 4.

Figure 10:
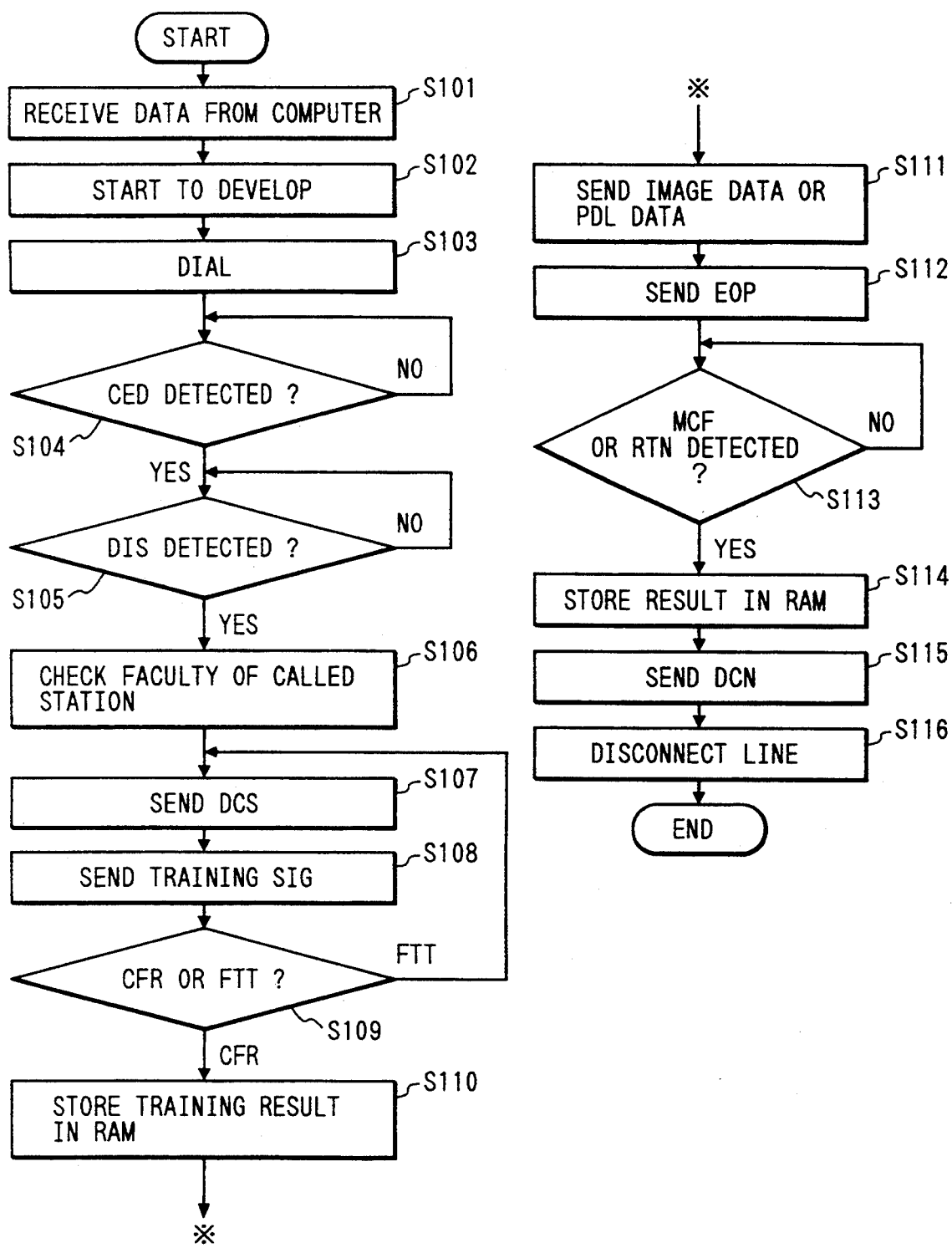
FIG. 10 is a flowchart showing a transmission control procedure.
Figure 11:
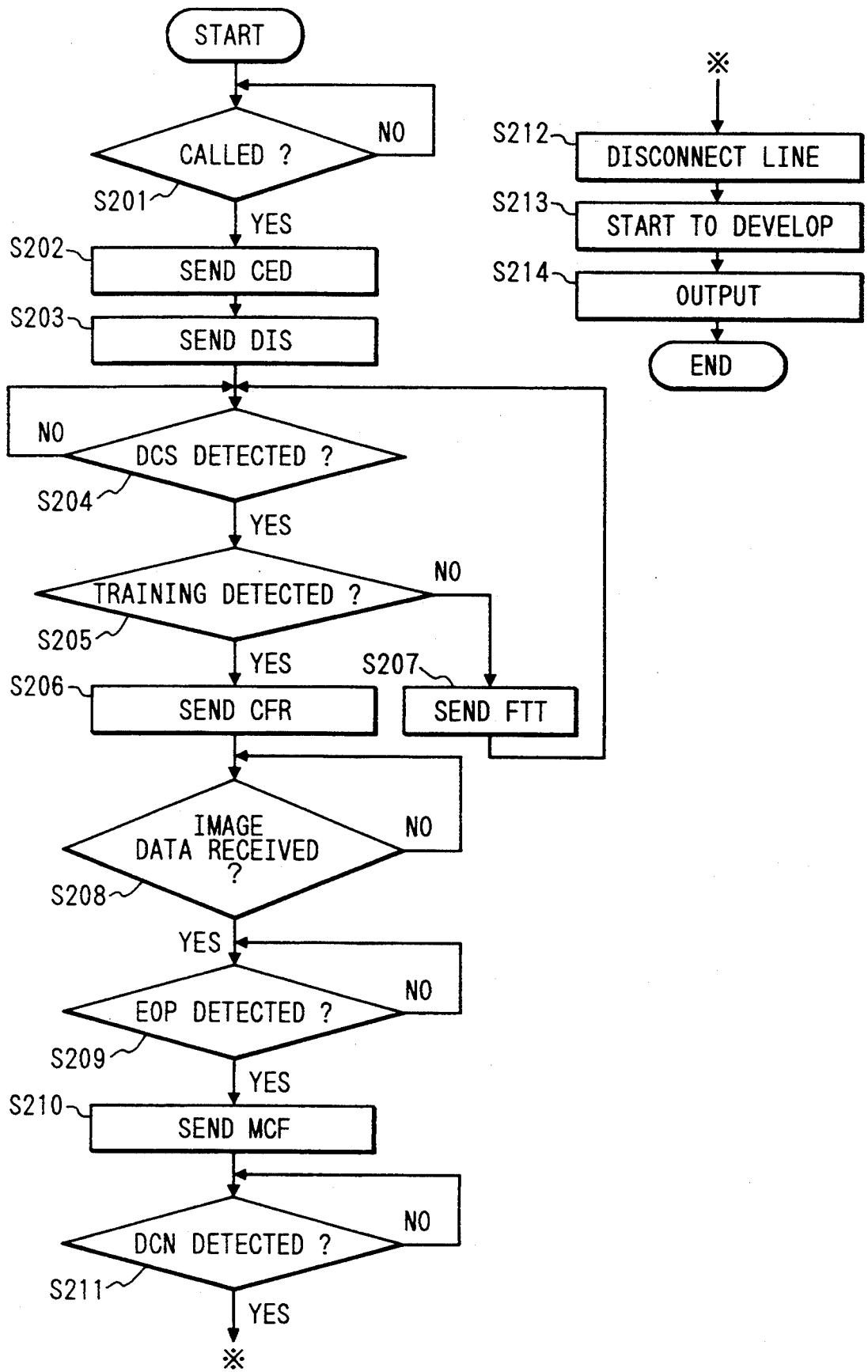
FIG. 11 is a flowchart showing a reception control procedure.

FIG. 8 shows a procedure of a facsimile call according to the recommendation T30 of CCITT. FIG. 10 shows a flowchart on the calling end (or the calling station). FIG. 11 shows a flowchart on the called end (or the called station). A procedure for the data transmission and reception will now be described with reference to those diagrams.

In step S101 in FIG. 10, the PDL data is first transmitted from the computer together with the telephone number on the transmission side and the instruction of the transmitting mode.

In step S102, the formater 8 receives the data and starts to develop it. The facsimile unit 4 starts the facsimile calling. In step S103, the calling end dials. When the called end connects the telephone line in step S201, the procedure of FIG. 8 is started.

In steps S104 and S202, the called end first sends CED in a phase A.

In steps S105 and S203, a phase mode advances to a phase B and NSF (Non-Standard Facility), CSI, and DIS are sent. Information necessary to the operations in the embodiment is assigned in the fourth octet of FIF of the NSF.

As shown in FIG. 9, the first and second octets denote CCITT member codes and the third octet indicates a maker code. The presence or absence of the developing faculties of LIPS II, LIPS III, and PS (PostScript)

is allocated to bits 0, 1, and 2 of the fourth octet, respectively. "1" indicates the presence of the developing faculty. The kinds of PDL data are not limited to LIPS II, LIPS III, and PS mentioned above but various kinds of page describing languages can be applied.

In step S106, the CPU 412 on the calling end stores the facility of the partner apparatus into the backup memory 417.

In steps S107 and S204, the calling end subsequently issues NSS, TSI, and DSC.

An operating mode and PDL are designated here. Since the image data has already been developed in the formater 8, the kind of PDL is known. Therefore, for instance, now assuming that the kind of PDL is set to LIPS II, the bit 0 of the fourth octet of NSS is set to "1"(refer to FIG. 9). To transmit the PDL, the data must not include any error. Therefore, the ECM mode is also simultaneously designated by DCS.

In steps S108 and S205, the training is subsequently executed (a training check signal is sent), thereby checking a state of the line. The training is first performed at 14.4 kbps. When the line is in a good state, the phase is shifted to C. When the line is not good, a baud rate is reduced. In step S206, when it is determined from the result of the training that the line is good, CFR is sent. If NO, FTT is sent in step S207.

When the line state is not good in step S109, NSS, TSI, and DCS are again sent, thereby informing so as to send the code data of an ordinary image. The same shall also apply in the case where the apparatus on the partner side doesn't have the developing facility of the PDL. The image signal developed in the formater 8 is transferred to the facsimile unit 4 through the core unit 10 for a period of time during which NSS, TSI, and DCS are transmitted. Generally, it takes a few seconds to develop the image data in the formater, so that there is an enough time because it takes twenty seconds until the end of the training after dialing. The variable magnify circuit 403 of the facsimile unit converts the resolution of 240 dpi of LIPS II into 8 pel/3.85 lines and writes the image data into either one of the memories A to D by the memory controller 404. After that, the operations are executed in a manner similar to the ordinary procedure mentioned above.

In step S110, the telephone number of the apparatus on the partner side and the training result indicative of the state of the line corresponding to the telephone number are stored into the backup memory 417.

In case of transmitting the PDL data as it is in steps S111 and S208, the data stored in the dual port memory 410 is once transferred into a space region in the memories A to D and, after that, the data is transferred to the line via the MODEM 414 and NCU 415. In this instance, the data is transmitted in the ECM mode. In the ECM mode, data is transmitted at a rate of 256 bytes per frame and 256 frames per block as is well known. The frame with an error must be again transmitted. Therefore, it is necessary to store the data into the memories A to D. In the facsimile unit on the called end, the data is also once stored into the memories.

When all of the image signal or PDL data is transmitted, a procedure is shifted to the phase D.

In steps S112 and S209, the calling end issues EOP to indicate the end of transmission.

In steps S113 and S210, the called end issues MCF.

In step S113, if the called end sends RTN and the line state is bad, it is stored into the backup RAM.

In steps S115, S116, S211, and S212, the procedure is shifted to the phase E, the line is closed by DCN, and the facsimile calling is finished.

In steps S213 and S214, the facsimile unit 4 which received the PDL data sequentially transfers the data to the formater 8 through the dual port memory 410 and core unit 10 at the time of completion of the reception of the data of one frame. Each time the data is transferred, the formater 8 sequentially develops into the image. After completion of the development, the image is generated from the printer 2 as mentioned above.

The operations are finished as mentioned above.

(Second embodiment)

The case of inputting data from an external memory unit will now be described as a second embodiment.

Figure 12:
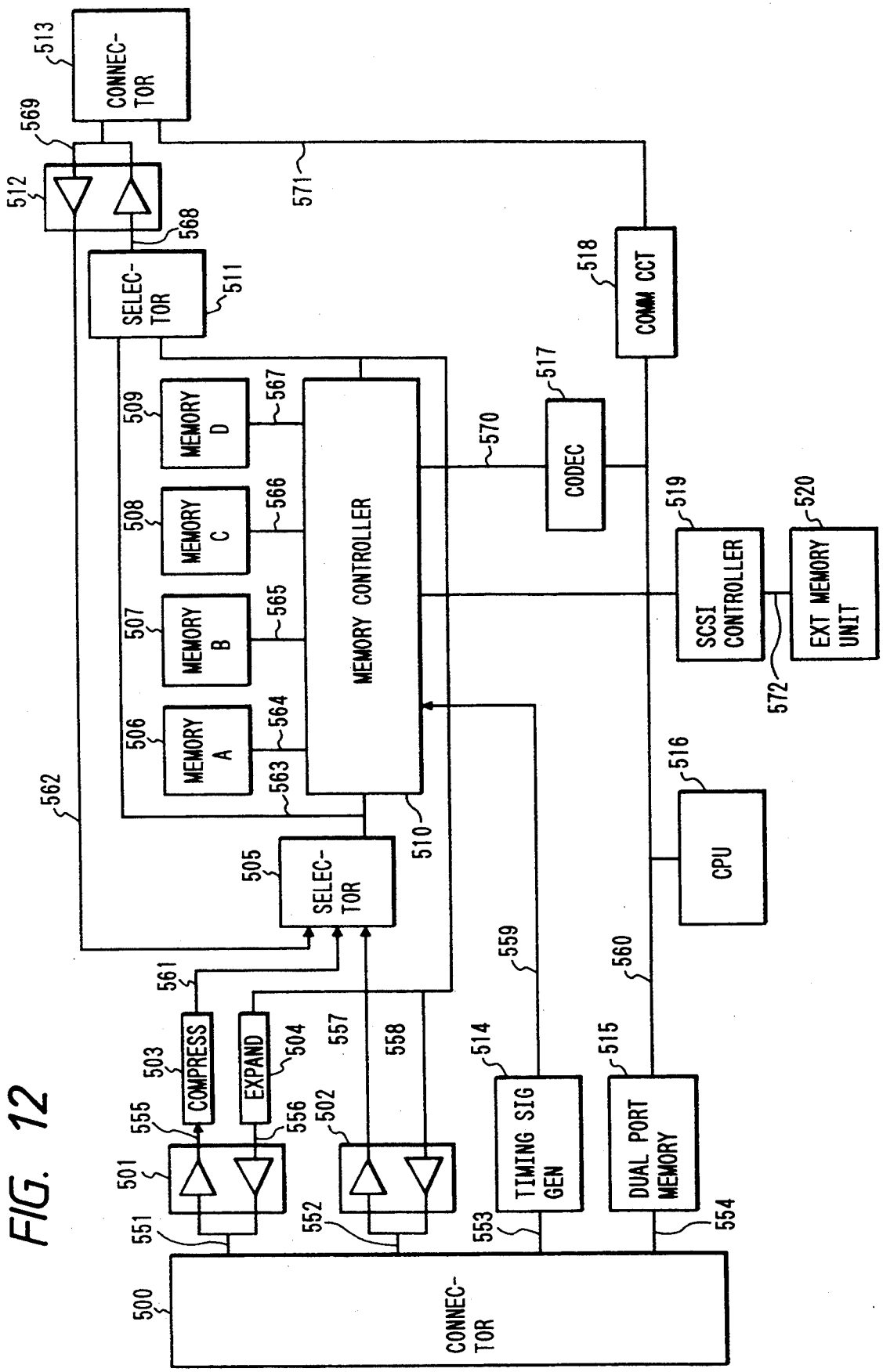
FIG. 12 is a block diagram showing a construction of a file unit 5.

The file unit 5 will now be described in detail with reference to FIG. 12.

The file unit 5 is connected to the core unit 10 by a connector 500 and executes the transmission and reception of various kinds of signals. Reference numeral 551 denotes a bidirectional 8-bit multivalue image signal which is supplied into a buffer 501. The buffer 501 separates the bidirectional signal 551 into a multivalue output signal 556 from the file unit 5 and a multivalue input signal 555 to the file unit 5. The multivalue input signal 555 is sent to a compressing circuit 503, by which the multivalue image data is converted into the binary compression information and supplied to a selector 505. A signal 552 is a bidirectional binary image signal and is connected to a buffer 502. The buffer 502 separates the bidirectional binary signal 552 into a binary output signal 558 from the file unit 5 and a binary input signal 557 to the file unit 5. The binary input signal 557 is sent to the selector 505. In accordance with an instruction from a CPU 516, the selector 505 selects either one of the three kinds of signals such as output signal 561 from the compressing circuit 503, output signal 557 from the buffer 502, and output signal 562 from a buffer 512 and supplies to a memory controller 510. An output signal 563 of the selector 505 is also sent to a selector 511. In the case where the compression information which is obtained by compressing the 8-bit multivalue information from the core unit 10 is stored into either one of memories A506, B507, C508, and D509, the selector 505 selects the signal 561. In case of storing the binary information into the memory, the selector 505 selects the signal 557. On the other hand, in case of storing the information from the man-machine interface 6 shown in FIG. 1 into the memory, the selector 505 selects the signal 562. The output signal 563 of the selector 505 is stored into either one of the memories A506 to D509 or a memory which is constructed by cascade connecting two memories under control of the memory controller 510. The memory controller 510 has the following four functions: namely, a mode to perform the data transmission and reception between the memories A506 to D509 and a CPU bus 560 in accordance with an instruction of the CPU 516; a mode to perform the data transmission and reception with a CODEC bus 570 of a CODEC 517 to execute encoding and decoding processes; a mode to store the signal 563 into either one of the memories A506 to D509 under control of a timing generator 514; and a mode for reading out the memory content from either one of the memories A506 to D509 and supplying to the signal line 558. Each of the memories A506 to D509 has a capacity of 2 Mbytes and stores the image data corresponding to the original of the A4 size at a resolution of 400 dpi. The timing generator 514 is connected to the connector 500 via a signal line 553 and is made operative by control signals (HSYNC, HEN, VSYNC, VEN) from the core unit 10 and generates a signal to accomplish the following two functions. One of them is a function to store the information from the core unit 10 into either one of the memories A506 to D509 or two memories. The other is a function for reading out the image data from either one of the memories A506 to D509 and transmitting to the signal line 558. A connector 503 executes the signal transmission and reception with the man-machine interface 6 shown in FIG. 1. The image data is supplied to the buffer 512. The command is supplied to a communication circuit 518. A signal 569 is a bidirectional image signal. When the image data is received from the man-machine interface 6, the buffer 512 supplies it to the signal line 562. In case of outputting the image data from the file unit 5 to the man-machine interface 6, the data on the signal line 568 is transferred through the buffer 512 and connector 513. A dual port memory 515 is connected to the CPU 1003 of the core unit 10 through a signal line 554 and is connected to the CPU 516 of the file unit 5 through the signal line 560. Each of the CPUs 1003 and 516 performs the transmission and reception of the command through the dual port memory 515. An SCSI controller 519 interfaces with an external memory unit 520 connected to the file unit 5 in FIG. 1. Practically speaking, the external memory unit 520 is constructed by a magnetooptic disc and accumulates data such as image data or the like. The CODEC 517 reads out the image data stored in either one of the memories A506 to D509 and encodes in accordance with a desired one of the MH, MR, and MMR methods and, after that, stores as coded data into either one of the memories A506 to D509. The coded information stored in either one of the memories A506 to D509 is read out and decoded by a desired one of the MH, MR, and MMR methods. After that, the decoded image data is stored into either one of the memories A506 to D509 as decoded data, namely, as image data.

One operation to accumulate file information into the external memory unit 520 will now be described. The 8-bit multivalue image signal from the reader 1 is supplied from the connector 500 and is sent to the buffer 501 via the signal line 551. The buffer 501 sends the signal 551 to the signal line 555 by the setting by the CPU 516. The signal 555 is supplied to the compressing circuit 503, by which it is converted into the binary compression data 561. The compression data 561 is sent to the selector 505 and, after that, it is transferred to the memory controller 510. The signal 563 is sent to the memory controller 510 and is also transmitted to the man-machine interface 6 through the selector 511, buffer 512, and connector 513. The memory controller 510 allows the timing generator 514 to generate a timing signal 559 by the signal 553 from the core unit 10. In response to the timing signal 559, the compression signal 563 is stored into the memory A506. The CPU 516 connects the memories A506 and B507 of the memory controller 510 to the bus line 570 of the CODEC 517. The CODEC 517 reads out the compressed information from the memory A506 and encodes by the MR method and writes the coded data into the memory B507. After the CODEC 517 finished the coding process, the CPU 516 connects the memory B507 of the memory controller 510 to the CPU bus 560. The CPU 516 sequentially reads out the coded data from the memory B507 and transfers to the SCSI controller 519. The SCSI controller 519 stores coded data 572 into the external memory unit 520.

An embodiment for reading out information from the external memory unit 520 and supplying to the printer 2 will now be described. When an information search instruction and a print instruction are received from the man-machine interface 6, the CPU 516 receives the coded data from the external memory unit 520 through the SCSI controller 519 and transfers the coded data into the memory C508. In this instance, the memory controller 510 connects the CPU bus 560 to a bus 566 of the memory C508 by an instruction from the CPU 516. After the coded data was transferred into the memory C508, the CPU 516 controls the memory controller 510, thereby connecting the memories C508 and D509 to the bus 570 of the CODEC 517. The CODEC 517 reads out the coded data from the memory C508 and sequentially decodes and, after that, transfers to the memory D509. The CPU 516 communicates with the CPU 1003 of the core unit 10 through the dual port memory 515 and sets so as to read out the decoded data from the memory D509 and to generate a printed image from the printer 2 via the core unit 10. After completion of the setting, the CPU 516 makes the timing generator 514 operative so as to generate a predetermined timing signal to the memory controller 510 via the signal line 559. The memory controller 510 reads out the decoded data from the memory D509 and transmits to the signal line 558 synchronously with the signal from the timing generator 514. The signal 558 is sent to an expanding circuit 504, by which the decoded data is expanded and converted into the image data. The output signal 556 of the expanding circuit 504 is sent to the buffer 501 and supplied to the connector 500 through the signal line 551. Since the operations which are executed until the image data is sent from the connector 500 and is generated as a print image from the printer 2 are performed in a manner similar to the case described with respect to the core unit 10, their descriptions are omitted here.

In addition to the image data, data described by LIPS or PS or the like can be also written by a computer onto a magnetooptic disc. In such a case, the data is transferred to the dual port memory 515 through the SCSI controller 519 and sent to the formater 8 or facsimile unit 4 from the core unit 10.

It is now assumed that the data on the magnetooptic disc in the external memory unit 520 is transmitted via the facsimile. The head portion of the data on a desired magnetooptic disc is first read out. A format of the data has been written in such a head portion. Therefore, a check is made to see if the data in the head portion indicates LIPS II or LIPS III or image data. It is now assumed that the data format is set to LIPS II.

Since the telephone number has already been designated from the operation unit, the facility of the partner apparatus is judged from the telephone number stored in the backup memory 417 in a manner as mentioned in the first embodiment. When the partner apparatus doesn't have the developing facility of LIPS II, the data is transferred from the file unit 5 to the formater 8 and is developed into the image and, after that, the image data is transmitted to the memory of the facsimile unit 4.

When the partner apparatus has the developing facility of LIPS II, the state of the line stored is subsequently judged. When it is determined that the data cannot be transmitted by the PDL due to the preceding information stored in the backup memory 417, the data is also developed into the image and the image data is transmitted.

Since the actual transmitting procedure is similar to that mentioned in the first embodiment, its detailed description is omitted here.

At a time point of the completion of the transmission, the line state and the like have been stored in the backup memory 417 and such information is transferred into the file unit 5. The information is written onto the magnetooptic disc in the external memory unit 520. Consequently, when information is transmitted via the facsimile by another system, even in the case where such information doesn't exist in the memory of the facsimile unit, a control similar to that mentioned above can be executed on the basis of the information which is read out from the magnetooptic disc.

The present invention is not limited to the foregoing embodiments but many modifications and variations are possible within the spirit and scope of the appended claims of the invention.

What is claimed is:

1. An image communicating apparatus comprising:
    input means for inputting code data such as a character code or the like;
    converting means for converting said input code data into image data;
    transmitting means for transmitting the code data inputted by said input means or the image data converted by said converting means; and
    control means for judging a faculty of a communication partner station and for judging a line state, thereby selecting either one of a mode for transmitting the code data and a mode for transmitting the image data converted by the converting means in accordance with the faculty of the communication partner station and the line state.

2. An apparatus according to claim 1, wherein said transmitting means transmits the code data in accordance with a facsimile communicating procedure in an error retransmitting mode.

3. An apparatus according to claim 1, further comprising memory means for storing information indicative of a faculty of the communication partner station, and wherein said control means judges the faculty of the communication partner station in accordance with the information stored in said memory means.

4. An apparatus according to claim 1, further comprising memory means for storing information indicative of a state of the line connected to the communication partner station, and wherein said control means judges a state of the line connected to the communication partner station in accordance with the information stored in said memory means.

5. An image communicating apparatus comprising:
    input means for inputting code data such as a character code or the like;
    converting means for converting said input code data into image data;
    transmitting means for transmitting the code data inputted by said input means or the image data converted by said converting means; and
    control means for judging a faculty of a communication partner station and for judging a line state, thereby selecting either one of a mode for transmitting the code data and a mode for transmitting the image data converted by the converting means in accordance with the results of the judgment,
    wherein said transmitting means transmits the code data in accordance with a facsimile communicating procedure in an error retransmitting mode, and
    wherein when said code data is transmitted in the error retransmitting mode and error data remains due to a defective line state, said control means selects the mode for transmitting the image data resulting from operation of said converting means.

6. A data communicating apparatus for communicating code data, comprising:
    converting means for converting said code data to be transmitted into image data;
    transmitting means for transmitting said code data or said image data; and
    control means for judging a faculty of a communication partner station and for judging a communicating condition, thereby selecting either one of a mode for transmitting said code data and a mode for transmitting said image data converted by said converting means in accordance with the faculty of the communication partner station and the communicating condition.

7. An apparatus according to claim 6, wherein said transmitting means transmits the code data in accordance with a facsimile communicating procedure in an error retransmitting mode.

8. An apparatus according to claim 6, further comprising memory means for storing information indicative of a faculty of the communication partner station, and wherein said control means judges the faculty of the communication partner station in accordance with the information stored in said memory means.

9. An apparatus according to claim 6, further having memory means for storing information indicative of the communicating condition with the communication partner station, and wherein said control means judges the communicating condition with the communication partner station in accordance with the information stored in said memory means.

10. A data communicating apparatus for communicating code data, comprising:
    converting means for converting said code data to be transmitted into image data;
    transmitting means for transmitting said code data or said image data; and
    control means for judging a faculty of a communication partner station and for judging a communicating condition, thereby selecting either one of a mode for transmitting said code data and a mode for transmitting said image data converted by said converting means in accordance with the results of the judgement,
    wherein said transmitting means transmits the code data in accordance with a facsimile communicating procedure in an error retransmitting mode, and
    wherein when said code data is transmitted in the error retransmitting mode and the error data remains due to a defective communicating condition, said control means selects the mode for transmitting the image data of said converting means.

11. A communicating method of code data, comprising the steps of:
    judging a faculty of a communication partner station and a communicating condition;
    transmitting the code data as it is in the case where said communication partner station has a receiving function of the code data and the communicating condition is good; and converting the code data into image data and transmitting said image data in the case where the communicating condition is not good even if the communication partner station has the receiving faculty of the code data.

12. A method according to claim 11, wherein when the communication without a communication error can be performed, it is determined that the communicating condition is good, on the other hand, when there is a communication error, it is decided that the communicating condition is defective.

13. A method according to claim 11, further comprising the steps of:

previously registering information indicative of the faculty of the communication partner station; and judging the faculty of the communication partner station in accordance with said registered information when the code data is transmitted.

14. A method according to claim 11, further comprising the steps of:

previously registering the faculty of the communication partner station and information indicative of a past communicating condition with said communication partner station; and judging the faculty of the communication partner station and the communicating condition in accordance with said registered information when the code data is transmitted.

* * * * *